(12) United States Patent
Gadgil et al.

(10) Patent No.: US 6,602,425 B2
(45) Date of Patent: Aug. 5, 2003

(54) METHOD FOR LOW COST WATER DISINFECTION

(75) Inventors: Ashok J. Gadgil, El Cerrito, CA (US); Anushka Drescher, Berkeley, CA (US)

(73) Assignee: Water Health International, Inc., El Cerrito, CA (US)

( * ) Notice: Subject to any disclaimer, the term of this patent is extended or adjusted under 35 U.S.C. 154(b) by 0 days.

(21) Appl. No.: 10/118,072

(22) Filed: Apr. 5, 2002

(65) Prior Publication Data

US 2002/0113022 A1 Aug. 22, 2002

Related U.S. Application Data

(62) Division of application No. 09/513,799, filed on Feb. 25, 2000, now Pat. No. 6,419,821.

(51) Int. Cl.[7] .................................................. C02F 1/32
(52) U.S. Cl. .................... 210/744; 210/748; 250/434; 250/430; 250/438; 422/24
(58) Field of Search ................... 210/739, 744, 210/748, 764, 758, 760, 86, 109, 138, 143, 192, 198.1, 202, 203, 209, 256, 257.1, 261, 262; 250/430, 434, 438; 422/186.3, 24

(56) References Cited

U.S. PATENT DOCUMENTS

| 2,504,349 A | 4/1950 | Prieto |
| 3,491,234 A | 1/1970 | Wiltrout |
| 3,562,520 A | 2/1971 | Hippen |
| 3,710,111 A | 1/1973 | Collura |
| 3,836,781 A | 9/1974 | Ellison |
| 3,858,048 A | 12/1974 | Shand et al. |
| 4,102,645 A | 7/1978 | Meacham, Jr. et al. |
| 4,201,916 A | 5/1980 | Ellner |
| 4,304,996 A | 12/1981 | Blades |
| 4,622,465 A | 11/1986 | Harig et al. |
| 4,629,896 A | 12/1986 | Bridgen |
| 4,661,264 A | 4/1987 | Goudy, Jr. |
| 4,742,231 A | 5/1988 | Bridgen |
| 4,899,057 A | 2/1990 | Koji ............................ 250/436 |
| 4,909,931 A | 3/1990 | Bibi ............................ 210/85 |
| 5,186,830 A | 2/1993 | Rait ............................ 210/232 |
| 5,217,607 A | 6/1993 | Dalton, III et al. ......... 210/143 |
| 5,227,053 A | 7/1993 | Brym ......................... 210/143 |
| 5,230,792 A | 7/1993 | Sauska et al. |

(List continued on next page.)

OTHER PUBLICATIONS

Applications of Germicidal, Erythemal and Infrared Energy, Matthew Luckiesh, D.Sc., D.E., D. Van NOstrand Co., Inc. New York, NY, 1946, pp. foreward, 231–269, 441–451.

*Primary Examiner*—Peter A. Hruskoci
(74) *Attorney, Agent, or Firm*—Knobbe, Martens, Olson & Bear, LLP (57) ABSTRACT

A low cost system for providing drinking water includes a feed water container with a simple ceramic filter covering an outlet of the feed water container. The preferred filter is generally cylindrically shaped with a bore extending partially therethrough, in a configuration commonly referred to as a "ceramic candle" filter in developing countries. Under force of gravity, feed water filters through the ceramic to a storage container below. The filtered water is irradiated with ultraviolet (UV) energy either as it flows or after collection in the storage container. In one embodiment, filtered water is temporarily collected in an intermediate holding tank, where it can be irradiated constantly on in batches and periodically released to the lower container. Filtration through ceramic provides clear water with a low UV extinction coefficient for more efficient UV disinfection. Additionally, gravity fed filtration through ceramic provides a slow rate of water flow and a consequently high UV dose for a given UV intensity.

12 Claims, 11 Drawing Sheets

U.S. PATENT DOCUMENTS

| | | |
|---|---|---|
| RE34,513 E | 1/1994 | Ellner |
| 5,288,412 A | 2/1994 | Voorhees et al. ............ 210/739 |
| 5,366,705 A | 11/1994 | Reidy ......................... 422/243 |
| 5,387,804 A | 2/1995 | Suzuki et al. ................. 257/77 |
| 5,420,432 A | 5/1995 | Manook et al. |
| 5,441,179 A | 8/1995 | Marsh |
| 5,503,800 A | 4/1996 | Free |
| 5,536,403 A | 7/1996 | Sugimoto ................... 210/256 |
| 5,545,335 A | 8/1996 | Sween et al. ............... 210/748 |
| 5,584,990 A | 12/1996 | Sugimoto ................... 210/138 |
| 5,597,482 A | 1/1997 | Melyon ...................... 210/209 |
| 5,597,487 A | 1/1997 | Vogel et al. |
| 5,628,895 A | 5/1997 | Zucholl ....................... 210/85 |
| 5,632,890 A | 5/1997 | Sugimoto ................... 210/169 |
| 5,635,133 A | 6/1997 | Glazman |
| 5,660,719 A | 8/1997 | Kurtz et al. |
| 5,725,762 A | 3/1998 | Beal et al. ................... 210/181 |
| 5,780,860 A | 7/1998 | Gadgil et al. ............... 250/435 |
| 5,843,304 A | 12/1998 | Marchesseault et al. .... 210/143 |
| 5,843,309 A | 12/1998 | Mancil ....................... 210/205 |
| 5,877,392 A | 3/1999 | Russell et al. .............. 588/227 |
| 5,900,212 A | 5/1999 | Maiden et al. |
| 5,951,876 A | 9/1999 | Snowball .................... 210/748 |
| 6,031,241 A | 2/2000 | Silfvast et al. ........... 250/493.1 |
| 6,156,192 A * | 12/2000 | Rummler .................... 210/153 |
| 6,156,210 A | 12/2000 | Sadkhin ..................... 210/709 |
| 6,348,151 B1 * | 2/2002 | Kunkel ..................... 210/198.1 |
| 6,419,821 B1 * | 7/2002 | Gadgil et al. ............... 210/109 |

* cited by examiner

METHOD FOR LOW COST WATER DISINFECTION

REFERENCE TO RELATED APPLICATION

The present application is a divisional of U.S. application Ser. No. 09/513,799, filed Feb. 25, 2000, now U.S. Pat. No. 6,419,821.

FIELD OF THE INVENTION

The present invention relates in general to water disinfection for human consumption. More particularly, the invention relates to low cost water filtration and disinfection to provide drinking water in situations where resources are limited.

BACKGROUND OF THE INVENTION

In developing countries, drinking water is often difficult to obtain. Currently, every hour, more than four hundred children in the developing world die from water-borne diseases. Ordinarily, women and children haul water from open wells, rivers or lakes for daily use. They also are primarily responsible for gathering firewood. It is simply not feasible for them to gather enough wood to boil their drinking water, and chemical disinfection is cumbersome and often impractical in communities without a water system and without a supply chain of chemicals for disinfection. Diseases like cholera often spread through contaminated water. Vaccines are expensive and practically difficult to administer on a widespread basis. Furthermore, mutant strains of old diseases have made current vaccines ineffective. Similar concerns occur whenever people are camping, or in any post-disaster situations. Thus, the need for a portable, easy to use, but effective water disinfector exists around the world.

A wide variety of water disinfection systems are currently available. Typical systems, however, are unsuitable for disinfecting drinking water in developing countries. Many systems, for example, are designed to treat industrial water use or large-scale (e.g., municipal) water supply. These systems tend to be impractically expensive and complex for small scale use, e.g., for use by less than a dozen persons. Other systems are developed for household use in industrial countries or for developing country populations with a pressurized tap water supply. In this case, the systems tend to operate under pressure from the municipal water supply, and therefore are unsuitable for use in places without running water. Furthermore, such systems tend not to address some of the pathogens commonly found in developing countries, especially in sub-tropical and tropical climates.

Accordingly, a need exists for small-scale systems and methods for safe, effective provision of drinking water. Desirably, such systems and methods should be portable and inexpensive enough to be practical for use in remote locations, particularly in developing countries.

SUMMARY OF THE INVENTION

In accordance with one aspect of the present invention, a water disinfector is provided. The disinfector includes a gravity-driven feed water delivery system that defines a water flow path from an upstream inlet to a downstream outlet. A ceramic filter is positioned within the water flow path, while an ultraviolet light source is positioned to irradiate water downstream of the ceramic filter.

In accordance with another aspect of the present invention, a method is provided for disinfecting water. The method includes feeding water into a water delivery system. The water is driven by gravity through a ceramic filter to produce filtered water. This filtered water is then exposed to ultraviolet light within the water delivery system, downstream of the ceramic filter.

In the illustrated embodiments, the ceramic filter is a cylindrical "candle" filter with a bore extending partially therethrough. The filter is placed over an outlet in a container, and feed water poured into the container. This feed water then percolates through the filter, and is thence carried along a flow path through the outlet to a storage container. In several embodiments, the filtered water is disinfected by ultraviolet irradiation along the flow path. Irradiating the water in batches stored in the storage container can also disinfect the filtered water.

The invention represents an advancement in providing safe water to the people of developing countries. A very low-power UV lamp and a low cost ceramic filter enable provision of drinking water with only a small expenditure of electrical energy from virtually any fresh water source, even of uncertain or compromised biological quality. Gravity-driven operation keeps costs low while facilitating longer UV exposure times for the water, thus facilitating complete disinfection. The unique qualities of the water disinfector allows people in rural and underdeveloped regions of the world to enjoy that advantages of safe water at a low cost. Accordingly, decreases can be realized in infant deaths and general illness in such communities.

BRIEF DESCRIPTION OF THE DRAWINGS

These and other aspects of the invention will be readily apparent from the description below and from the appended drawings, which are meant to illustrate and not to limit the invention, and wherein.

DETAILED DESCRIPTION OF THE PREFERRED EMBODIMENTS

As noted in the Background section above, conventional water disinfection systems are unsuitable for use in remote locations, particularly in developing countries where resources are scarce. Many systems are designed for filtering already potable water, such as municipal water in developed locales, for improved taste, reduced mineral content, or as an additional barrier to biological contamination in already treated water. Others, designed for disinfecting raw water in developing countries, particularly in sub-tropical and tropical climates, tend to be complex, difficult to service and expensive to operate due to difficult operating conditions and potentially high pathogen loads in the available water.

U.S. Pat. No. 5,780,860 to Gadgil et al. provides one solution to the need for inexpensive water disinfection in remote locations. The illustrated device employs a simple mechanism to guide water through a shallow tray beneath an air-suspended ultraviolet (UV) lamp. Under the force of gravity, water flows at a controlled rate beneath the UV lamp. The water path is carefully configured to produce a constant flow rate and even exposure of the flowing water to the disinfecting energy of the UV lamp. Despite the lack of pump means and using only 40 W of power for the UV lamp, commercial embodiments of the '860 patent can safely disinfect water with throughput as high as 15 L/min.

Though less complicated and less expensive than conventional water disinfection systems, the device of the '860 patent still represents significant initial and operational costs. The housing and tray define a carefully arranged water flow path to ensure even exposure of gravity-fed water to UV disinfecting light as water flows through the device, and so must be manufactured with particular care. Additionally, the disclosed lamp alone utilizes considerable power (e.g., about 40 W), for which the electrical power equivalent of an incandescent table lamp is required. Such systems require special provision where electric service is lacking or inconsistent. Units configured for use by a family or a small community (of several hundred persons) can currently cost several hundred dollars.

Figure 1A:
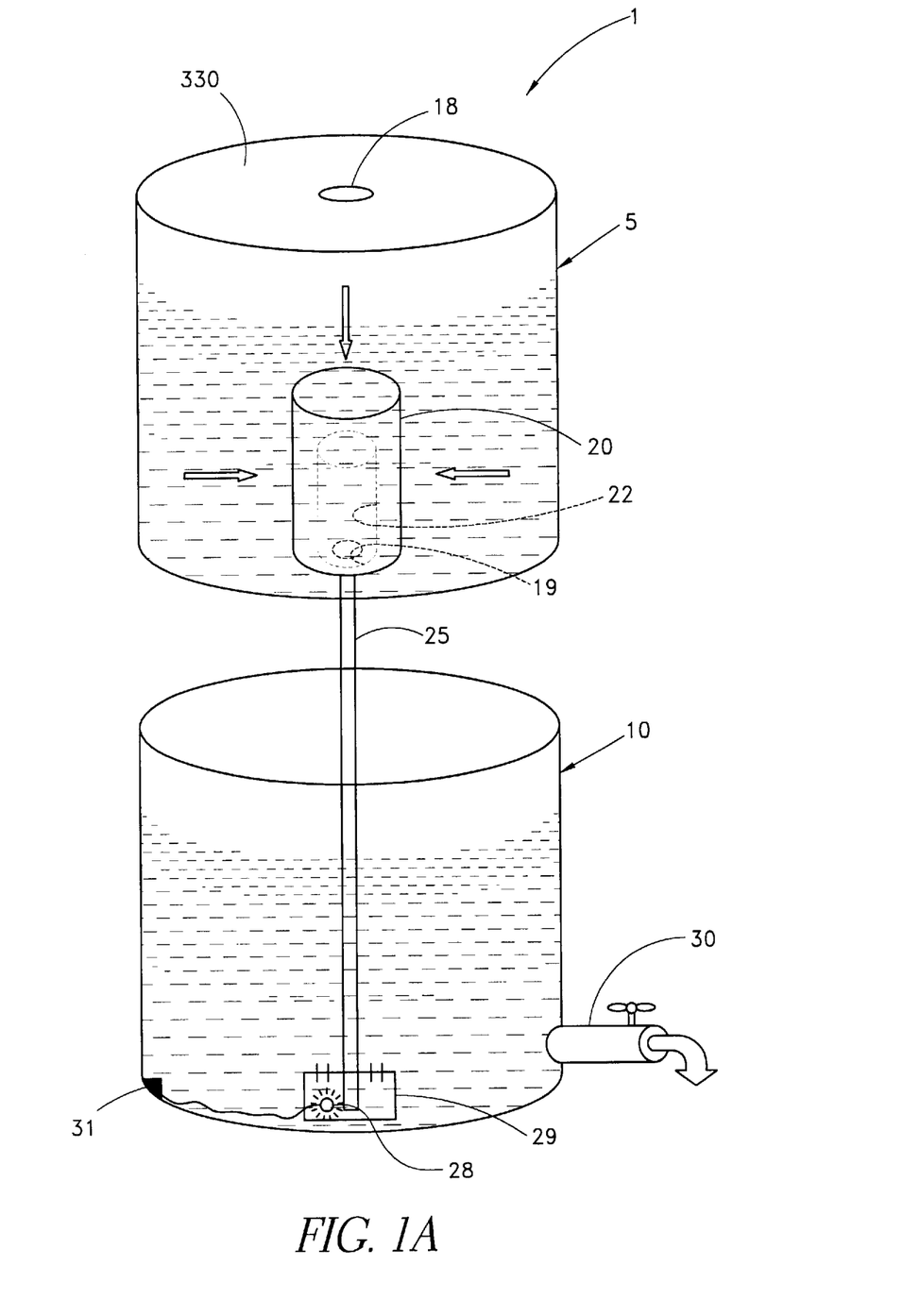
FIG. 1A is a schematic view of a water disinfector, constructed in accordance with a first preferred embodiment of the present invention.

FIG. 1A illustrates a simpler and significantly less expensive water disinfection unit 1, constructed in accordance with a preferred embodiment of the present invention. As shown, the disinfection unit 1 comprises an upper container or tank 5 and a lower container or tank 10. The upper tank 5 and lower tank 10 can be of any suitable size or shape. In the illustrated embodiment, the upper tank 5 and lower tank 10 each comprise plastic or metal barrels commonly available in developing countries. Exemplary tanks 5, 10 have a height of about 1.5 feet and a diameter of about 1.0 foot. While illustrated spaced apart, in practice the tanks 5, 10 are preferably stacked directly (see the embodiment of FIG. 3).

The upper tank 5 includes a lid 330, which may be provided with an inlet 18 through which feed water can be poured. Alternatively, the lid 330 may be temporarily removed to fill it with feed water. For example, a bucket filled at a water source (e.g., lake, river, well) can be poured into the tank 5. In other arrangements, the tank 5 can be open and without a lid, facilitating pouring. It will be understood, of course, that water can be pumped into the tank 5 where pump mechanisms are available. Desirably, however, the illustrated tank 5 is not itself pressurized. Rather, water flows through the disinfection unit 1 by gravity. The upper tank 5 also includes an outlet 19, preferably at a lower end of the upper tank 5. In the illustrated embodiment, the outlet 19 is located at the center of the bottom of the upper tank 5.

Proximate the outlet 19 is a filtration component, preferably a depth filtration element. More preferably, the filtration component comprises an unglazed ceramic member 20, and is illustrated in the form of a cylinder having a central bore 22 extending from one end of the cylinder and closed off at the opposite end. Such cylindrical ceramic members are typically referred to as ceramic "candles" due to their shape, and they have long been employed for simple filtration of dirty or silt-laden water in developing countries in Africa and on the Indian Subcontinent. Accordingly, such candle filters 20 are readily available in the primary areas of use for the water disinfection unit 1. As shown, the candle filter 20 preferably covers the outlet 19, with its central bore 22 aligned with and open to the outlet 19, such that water flows through the filter in order to reach the lower tank 10.

Figure 1B:
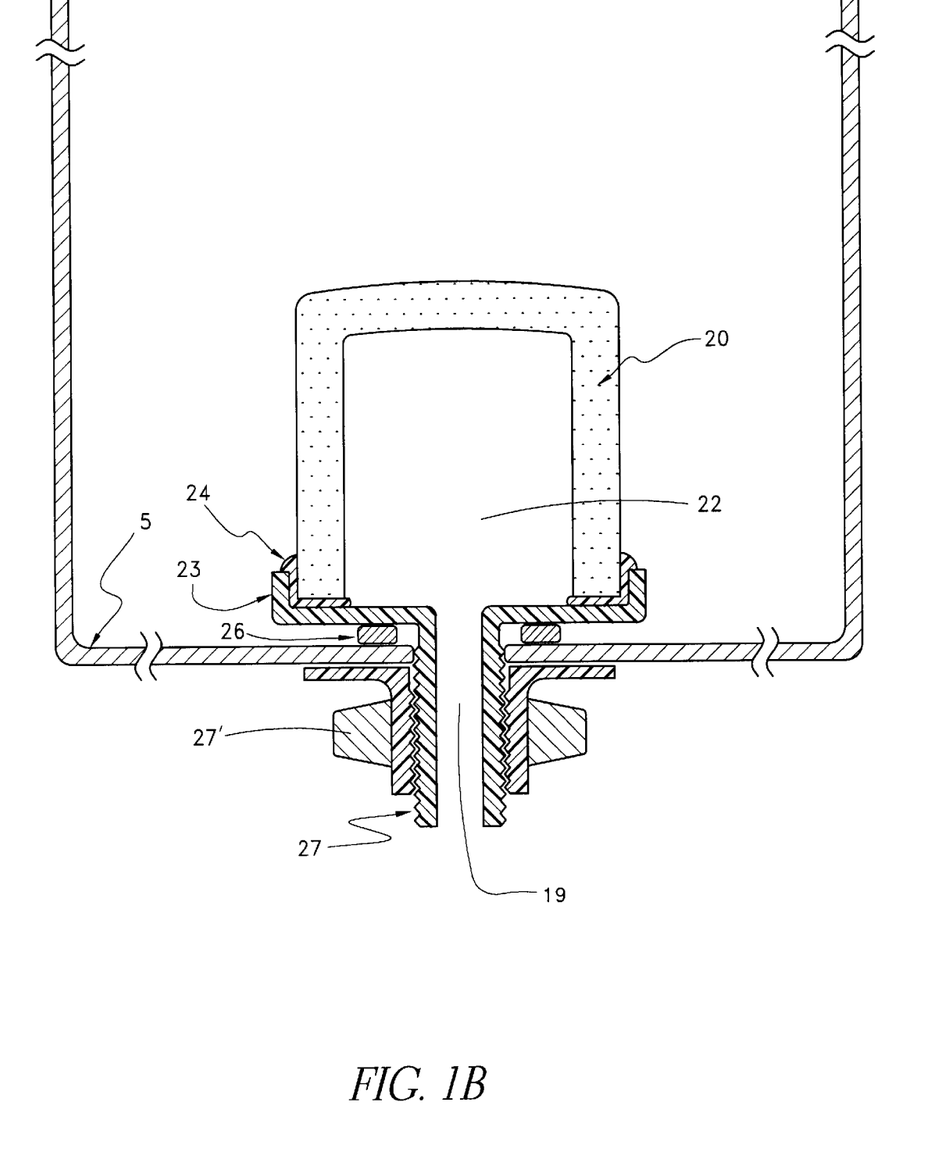
FIG. 1B is an enlarged cross-section, showing a ceramic candle in the upper tank of FIG. 1A.

With reference to FIG. 1B, the candle filter 20 is preferably sealed to the floor of the upper tank 5. In the illustrated embodiment, the candle filter 20 sits atop a plastic seat 23, with waterproof caulk beads 24 sandwiched between the candle filter 20 and the plastic seat 23. A compression gasket 26 lies between the plastic seat 23 and the bottom of the upper tank 5. A plastic hollow bolt 27, desirably molded as an integral part of the plastic seat 23, extends through the tank outlet 19. A wing nut 27' on the hollow bolt 27 tightens to compress the compression gasket 26 and thereby seal the seat 23 against the tank floor.

As is known in the art, ceramic can be provided with a variety of pore sizes. Preferably, the candle filter 20 has a nominal rating (i.e. the largest particle size it will allow through) of between about 0.5 microns and 10 microns; in the preferred embodiment, the rating of the candle filter 20 is less than about 2 microns.

The ceramic candle filter 20 preferably has a height between about 3 inches (7.5 cm) and 24 inches (60 cm) (illustrated at about 8 inches or 20 cm) and an external diameter between about 1 inch (2.5 cm) and 8 inches (20 cm) (illustrated at about 4 inches or 10 cm). The diameter, height, wall thickness and filtration rating of the candle filter 20 are selected to balance the desired level of filtration with the desired rate of water flow, and with further consideration for a suitable lifespan with periodic abrasive cleaning of the outer surface of the filter 20. Preferably, the walls have a thickness between about 0.25 inch (6.4 mm) and 3.0 inches (76.2 mm) for the typical porosity of a ceramic candle filter, more preferably between about 0.5 inch (12.7 mm) and 1.5 inches (38.1 mm). In the illustrated embodiment, the central bore 22 extends a length of about seven inches from the opening and has a diameter of about three inches. Such an arrangement leaves a sidewall and a top wall each with a thickness of about 0.5 inch (12.7 mm).

In the embodiment of FIG. 1A, the outlet 19 communicates with a pipe 25 leading to the lower tank 10. The lower tank 10 includes an ultraviolet (UV) light source 28 proximate the flow path within the lower tank 10. The UV light source 28, shown schematically in FIG. 1A to illustrate its position only, emits light including germicidal ultraviolet light. The emitted light preferably has peak energy or intensity at a wavelength between about 220 nm and 300 nm, more preferably between about 250 nm and 270 nm, in the illustrated embodiment is about 254 nm (dominant wavelength of low pressure mercury plasma discharge).

In the illustrated embodiment, the ultraviolet light source 28 preferably comprises a UV lamp of any one of a number of types, such as low, medium or high-pressure mercury lamps or xenon arc lamps, or a solid-state UV source (e.g., an LED), depending upon availability. Preferably, the UV lamp 28 consumes less than about 40 W, more preferably less than about 15 W, and the illustrated UV lamp consumes only about 4 W. Suitable 4 W UV lamps can be obtained, for example, from JKL Components Corp. of Pacoima, Calif. Such low power lamps can be powered by small rechargeable batteries, but can alternately be powered by an AC power supply. In other arrangements, extremely low power (e.g., in the milliwatt range) is consumed by light emitting diodes with emission in the UV range, as discussed further below with respect to FIG. 3.

The lower tank 10 also preferably includes an outlet, so the lower tank 10 does not need to be tipped to pour disinfected water. In the illustrated embodiment, the outlet comprises a tap 30 with a stopcock to facilitate controlled release of filtered and disinfected water, desirably located at or near the bottom of the lower tank 10.

As will be understood by the skilled artisan, the central bore 22, outlet 19, pipe 25, lower tank 10 and tap 30 define a flow path for water that has been filtered through the candle filter 20. While not necessarily fixed to one another, the upper and lower containers 5, 10 represent an integral system in the sense that they together define a water flow path. The UV lamp 28 is positioned to irradiate water along that path. The UV lamp 28 of the illustrated embodiment is preferably positioned in a lower portion (e.g., lower half) of the lower tank 10, and more preferably sits on the floor of the lower tank 10, such that it will typically be submerged in water during operation. Accordingly, the UV lamp 28 is preferably sealed in a quartz sleeve, in a manner well known to the skilled artisan.

Preferably, the UV lamp 28 is positioned proximate a bottleneck in the flow path, such as the lower end of the pipe 25 (as illustrated in FIG. 1) or near the tap 30. More preferably, the UV lamp 28 is positioned inside the pipe 25, near its bottom. The illustrated UV lamp 28 is advantageously housed in an inverted cup 29, surrounding (or almost surrounding) the lower end of the pipe 25, and preferably suspended from the pipe 25. As the skilled artisan will understand, the inverted cup 29 substantially encloses the lower end of the pipe 25 and the lamp 28 to ensure an adequate UV dose to the water even under conditions when the tap 30 is open. It also partially shields the material of the tank 10 from UV damage. Perforations at the upper end of the cup 29 allow irradiated water to slowly diffuse into the lower tank 10. Thus, water in the lower tank 10 is generally safe for consumption and security measures limiting use of the tap 30 can be avoided. For the illustrated 4 Watt lamp 28, the lamp 28 is preferably positioned within about 15 cm of the bottleneck in the flow path, more preferably within about 10 cm and most preferably within about 4 cm. If an appropriately sized lamp is available, the lamp 28 is most preferably placed within the descending pipe 25.

A power supply circuit 31 is provided in electrical communication between the power source (e.g., battery) and the lamp 28. The circuit 31 includes safety features such as ground fault circuit interrupt circuitry, a fuse and ballast for the lamp. Such circuitry is further described in U.S. Pat. No. 5,780,860 at Columns 13 and 14, the disclosure of which is incorporated herein by reference. Of course, the circuitry and electrical lines to the lamp 28 are also preferably sealed watertight.

In operation, feed water is poured through the inlet 18 in the upper tank 5. Under gravitational force, the water column in the upper tank 5 supplies pressure causing the feed water in the upper tank 5 to slowly percolate through the pores of the ceramic candle filter 20 and into the central bore 22, preferably at less than about 4 L/hr. The flow rate for the illustrated candle filter 20 is about 0.5 L/hr.

This process removes very fine particulate matter. Debris, silt, smaller particles and large bacteria are thereby filtered through the candle filter 20. The pores of the ceramic filter 20 make it an effective filter for the removal of particulate matter and fine sediment from the influent or feed water.

The candle filter 20 filters the feed water through surface filtration, depth filtration and adsorption. Many particles are removed by surface filtration, a sieving process that traps large contaminants on the top or leading surface of the candle filter 20. These larger particles include leaves, twigs, insects and other relatively large debris. Smaller particles pass through the surface layer of the ceramic filter 20 and are subsequently removed through depth filtration. With depth filtration, smaller particles, including large bacteria, some large protozoan cysts, asbestos fibers and similarly sized contaminants, become trapped as they make their way through the thickness of the ceramic walls. Additionally, some very small particles and dissolved molecules are adsorbed and retained by the ceramic material of the candle filter 20.

As the filter 20 removes particles from drinking water, the outermost pores of the ceramic candle filter 20 will eventually get clogged with retained particulates. While such particulate matter would quickly plug paper style filters, the preferred ceramic filter 20 can be quickly and easily cleaned for longer replacement life, thus lowering overall operational costs. Simple removal from the upper tank 5 and brushing the candle filter 20 cleans away debris from the surface and erodes the outer surface of the filter to expose fresh, unblocked pores. A low cost ceramic filter commonly available in developing countries (e.g., for about $2 currently) for water filtration can last about 3 months with regular cleaning.

Advantageously, the candle filter 20 can be prepared with markings through the thickness of the walls, serving as indicators of the remaining thickness after repeated abrasion to clean the surface. For example, $FeSO_4$ or $FeCl_3$ can be painted onto the candle and then baked in. The color sinks in by about 2 mm. The color visible on the outside surface changes as the thickness of the ceramic is worn away, such that the user is aware when replacement is needed.

Gravity fed operation, rather than high pressure, minimizes the risk of channeling. Channeling occurs when the pores of the filter are clogged and high water pressure forces crevices or cracks open, allowing water to flow unfiltered through the candle 20. Without pumps or high-pressure operation, the candle filter 20 tends to simply clog, rather than channel. An operator can then determine that water level in the upper tank 5 is not going down, signifying a blockage in the flow path and the need to clean the ceramic surfaces.

The flow rate through the ceramic filter(s), under gravitational pressure only, is generally less than 50 L/hour, and more typically less than about 4 L/hour for a single filter. The illustrated candle filter 20 has porosity in the range of about 3 to 4 microns, and with the surface area and thickness noted above, manages only about 0.5 L/hour. Feed water is filtered slowly through the thickness of the ceramic walls and a film of water creeps down the inside of the bore 22 to travel down the pipe 25 into the lower tank 10.

The flow rate through the ceramic candle filter can be increased by increasing the surface area of the filter. For instance, the surface area of ceramic candles can be increased by making helical or star-shaped grooves on their inner and outer surfaces. Other methods of increasing the flow rate are described with respect to the embodiments of FIGS. 6 and 9, below.

Viruses and many bacteria escape the filtration process and are carried along with the filtered water to the water flow path defined by the central bore 22 of the candle filter 20 and downstream elements. The UV lamp 28, downstream of the candle filter 20, therefore serves to disinfect water after it has been filtered.

The UV dose received by the filtered water is preferably at least about 16 mW-sec/cm$^2$, more preferably at least about 40 mW-sec/cm$^2$, and in the illustrated embodiment is between about 10,000 mW-sec/cm$^2$ to 80,000 mW-sec/cm$^2$. Such dosages meet or exceed NSF International standards for UV water disinfection devices, but at a fraction the cost of commercially available devices, and utilizing a fraction of the power (4 Watts in the illustrated embodiment). High doses of ultraviolet light energy at a peak wavelength of about 254 nm are provided by slow exposure of running, dripping or diffusing water to the low-power UV lamp 28.

Figure 2:
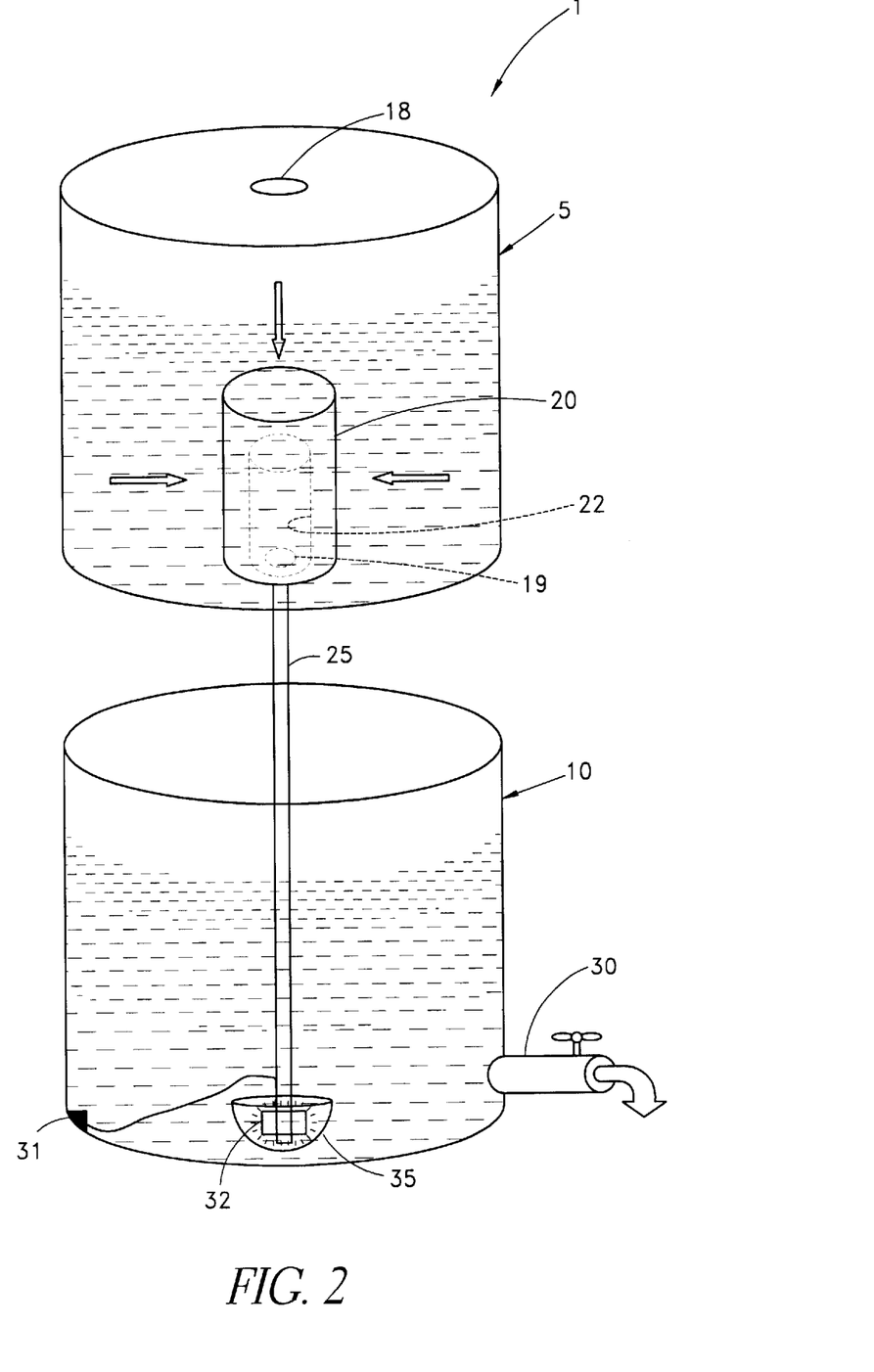
FIG. 2 is a schematic view of a water disinfector, constructed in accordance with a second embodiment of the present invention, having a submerged ultraviolet light source and cup.

FIG. 2 is a schematic view of a water disinfector 1, constructed in accordance with a second preferred embodiment of the present invention, where parts similar to those of the previously described embodiment are referenced by like numbers. As with the embodiment of FIG. 1, the upper tank 5 includes a ceramic filter element 20 over an outlet 19.

In contrast to the previously described embodiment, a UV light source or lamp 32 is located inside an intermediate holding container or cup 35, positioned in a lower portion (e.g., lower half) of the lower tank 10 and resting on the floor of the lower tank 10 in the illustrated embodiment. It will be understood, of course, that the cup 35 can take any suitable open container shape. The connecting pipe 25 communicates with the holding cup 35, preferably emptying into a lower portion (e.g., lower half) of the holding cup 35 to provide an adequate path length from the outlet of the pipe 25 to the lip of the cup 35. Water over this path length is exposed to the UV light source 32.

In operation, water drips from the candle filter 20 down the connecting pipe 25, enters the lower half of the holding cup 35 and is irradiated by the UV lamp 32. Once the holding cup 35 is filled with water, it begins to overflow the cup 35, past the lamp 32 and into the main body of the lower tank 10. The cup thus facilitates a longer residence time for water within a safe distance from the lamp 32. Preferably, for the flow rate of the illustrated candle filter 20, the average residence time of filtered water within the cup is preferably greater than about 15 seconds, more preferably greater than about 180 seconds. The long residence time, in turn, allows lesser lamp 32 power for a given UV light dosage, or conversely increases the UV light dosage for a give lamp power. Of course, residence time will depend upon the flow rate of the system. For example, a single candle filter 20 results in a residence time in a suspended cup 48 (FIG. 5) of about 2,000 seconds. However, when used with 4 candle filters (see FIGS. 6 and 9 and accompanying text), the average residence time of water in the UV cup 35 is about 500 seconds. Before overflowing the cup into the general lower tank 10 containing volume, the water is disinfected and ready for use.

Figure 3:
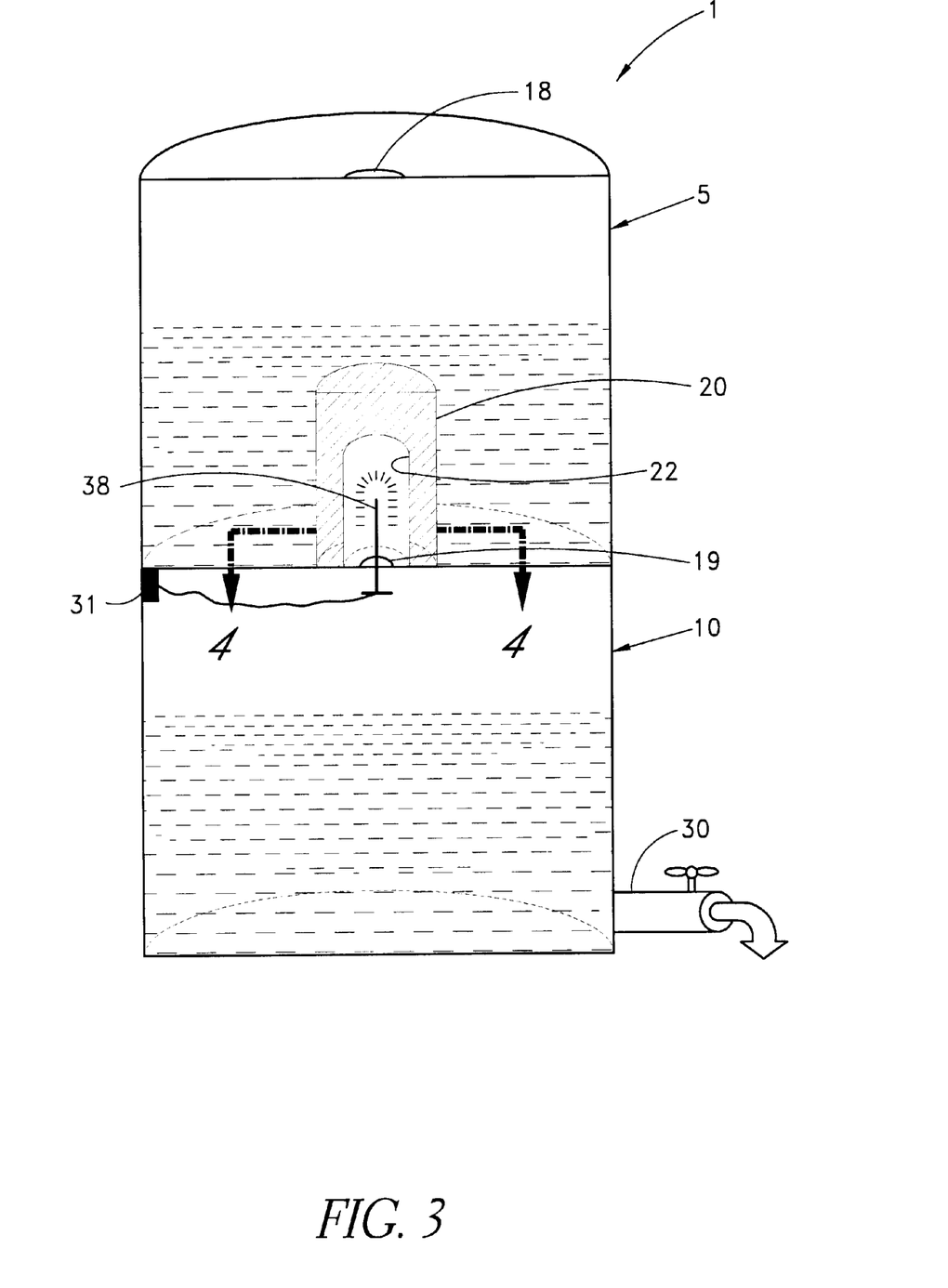
FIG. 3 is a partially cross-sectional schematic view of a water disinfector, constructed in accordance with a third embodiment of the present invention, having an ultraviolet light source within a bore of a hollow filtration element.
Figure 4:
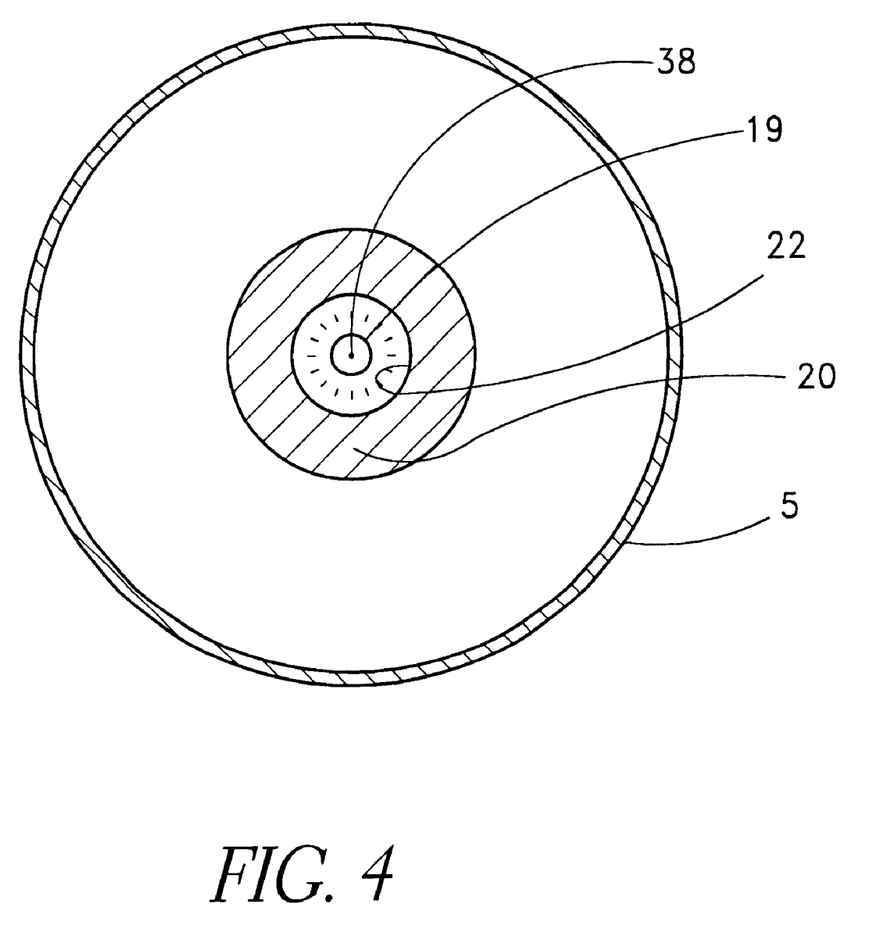
FIG. 4 is a sectional view taken along lines 4—4 of FIG. 3.

Referring to FIGS. 3 and 4, a water disinfector 1 is constructed in accordance with a third preferred embodiment of the present invention, where parts similar to those of the previously described embodiments are referenced by like numbers. A UV light source 38 is positioned such that it provides a UV energy dose of at least about 16 mW-sec/cm$^2$ to the filtered water flowing through the system, and more preferably at least about 40 mW-sec/cm$^2$. In the illustrated embodiment, it provides a dose of greater than about 400 mW-sec/cm$^2$ to the water. In the illustrated embodiment, a 4-watt UV light source 38 is located inside the central bore 22 of the ceramic candle filter 20, and preferably centered within the bore 22, such that filtered water flowing or dripping along the inside of the bore 22 passes the UV light source 38 at a distance of preferably no more than about 15 cm, more preferably no more than about 10 cm, and most preferably within about 4 cm. Lower power UV LEDs could also be used, but their power output and angular distribution of UV light is not known at present.

Note that, in the embodiment of FIGS. 3 and 4, filtered and disinfected water can simply drip from the outlet 19 into the lower tank 10, where the disinfected water is collected and stored. No connecting pipe is shown. Of course, it will be understood that a connecting pipe could also be employed in the embodiment of FIG. 3. The disinfected water can be dispensed by way of the tap 30.

Advantageously, the slow rate of percolation through walls of the candle filter 20, and consequently ensured long exposure of filtered water to the light source 38, allows employing very low power for the source 38. Though a conventional mercury or xenon arc lamp can be employed, these conventional devices consume far more power than is necessary for adequate disinfection. Accordingly, the illustrated UV light source 38 preferably comprises a solid state light emitting diode (LED), emitting light that includes significant intensity in the germicidal UV light range. Preferably, the light source 38 runs at less than about 1 Watt, and more preferably less than about 0.5 Watt. As an exemplary device, the band gap of aluminum nitride preferably provides, within an acceptable wavelength range (~260 nm), UV light in the power range of 0.5 to 2 mV.

Figure 5:
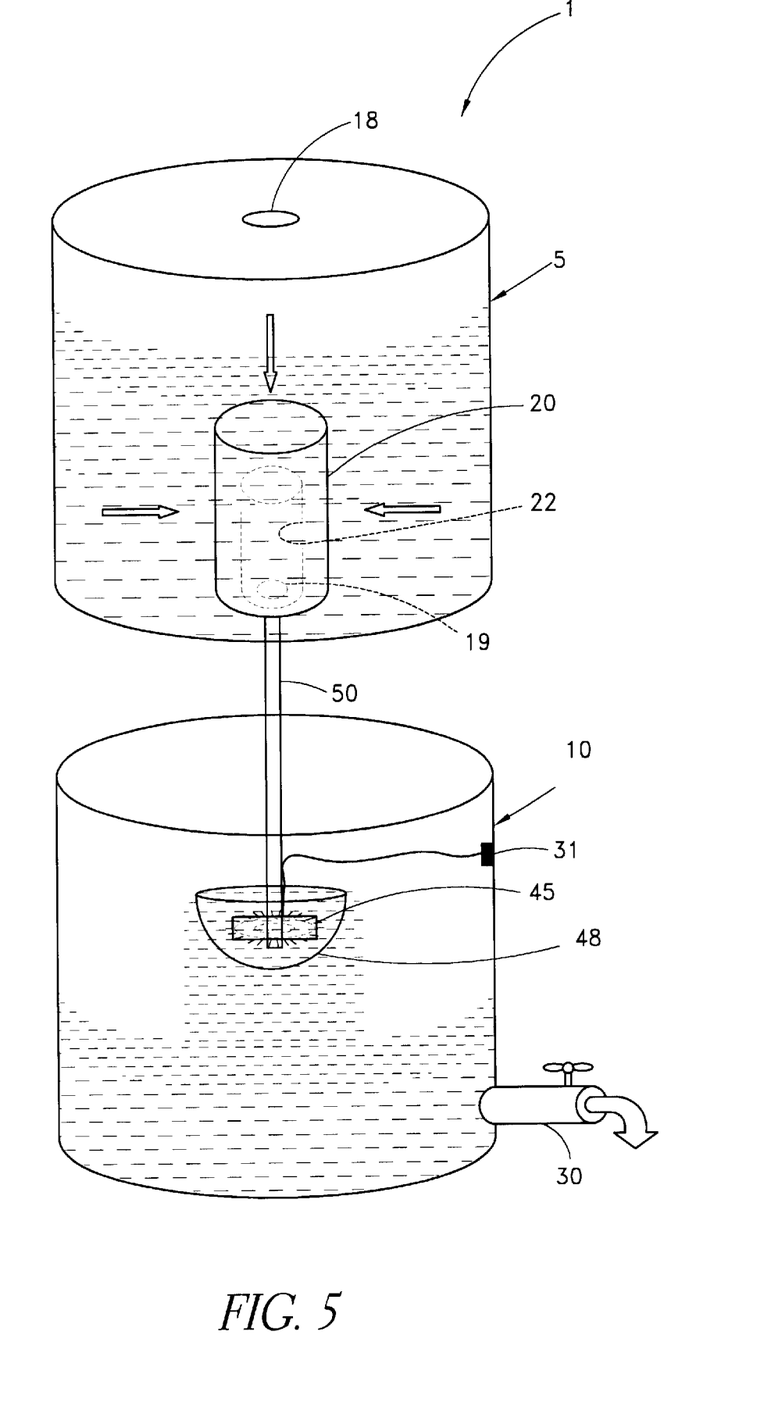
FIG. 5 is a schematic view of a water disinfector, constructed in accordance with a fourth embodiment of the present invention, having a suspended cup and ultraviolet light source.

FIG. 5 is a schematic view of a water disinfector 1 constructed in accordance with the fourth preferred embodiment of the present invention, where parts similar to those of the previously described embodiments are referenced by like numbers. In this embodiment, a UV light source comprises a conventional UV lamp 45 held in a suspended intermediate holding container or cup 48 within the lower tank 10, in the flow path of filtered water. In the illustrated embodiment, both the lamp 45 and the cup 48 are suspended by a connecting pipe 50 communicating filtered water from the outlet 19 above. The lamp 45 and cup 48 are suspended in an upper portion (e.g., upper half) of the lower tank 10, such that they are not immersed under normal operating conditions.

In other arrangements, it will be understood that the cup and lamp can be otherwise suspended (e.g., from the sidewalls of the lower tank or from the bottom of the upper tank) below the outlet, and water allowed to drip from the outlet into the cup. Additionally, the lamp can be suspended above the cup and filtered water routed past the lamp, such that the lamp need not be subjected to water (see, e.g., the suspended lamp arrangement of FIG. 7). Preferably, however, filtered water is communicated to the bottom of the cup 48, as shown.

In operation, as filtered water drips down the connecting pipe 50, it enters the holding cup 48 near the bottom of the cup 48. Water travels from the bottom of the holding cup 48, where the pipe 50 empties into the cup 48, to the lip of the cup 48 before overflowing. In the time it takes for the water to flow or diffuse from the bottom of the cup 48 to the lip, the water is exposed to the germicidal energy of the UV lamp 45. As with the submerged cup 35 of FIG. 2, filtered water has a relatively long residence time in the suspended cup 48, preferably greater than about 15 seconds, and more preferably greater than about 180 seconds. In this embodiment, having only one filter 20, the average residence time in the cup 48 is about 2000 seconds. Once water flows over the lip of the holding cup 48 into the greater lower tank 10, it is available for consumption via the tap 40.

Figure 6:
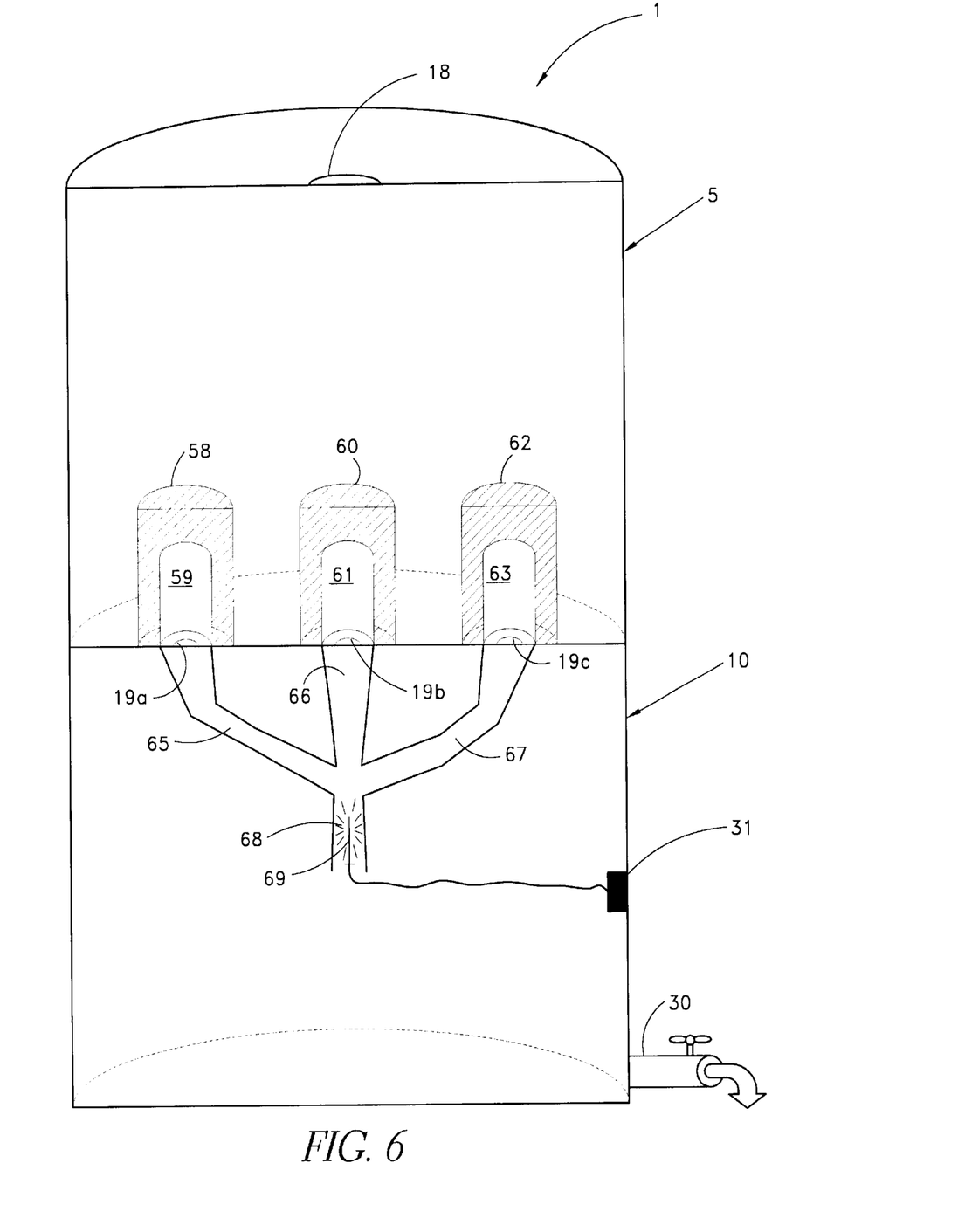
FIG. 6 is a partially cross-sectional schematic view of a water disinfector, constructed in accordance with a fifth embodiment of the present invention, employing multiple filtration elements in parallel.

FIG. 6 is a schematic view of a water disinfector 1 constructed in accordance with the fifth preferred embodiment of the present invention, where parts similar to those of the previously described embodiments are referenced by like numbers. The illustrated upper tank 5 includes multiple ceramic filters 58, 60, 62, each having their own central bores 59, 61, 63, respectively. The multiple ceramic filters 58, 60, 62 increases the overall flow of filtered water from the upper tank 5 to the lower tank 10. Each central bore 59, 61, 63 communicates through an outlet 19a, 19b, 19c in the bottom of the upper tank 5 with a connecting pipe 65, 66, 67. In the illustrated embodiment, the connecting pipes 65, 66, 67, in turn, communicate filtered water to a common collecting pipe 68. Filtered water thus follows a common flow path through the collecting pipe 68 into the lower or storage tank 10, and ultimately out the tap 30.

Desirably, a UV light source is positioned in the common flow path at or downstream of the collecting pipe 68. For example, a lamp could be placed in an upright cup, as in FIG. 5, or in an inverted cup, as in FIG. 1A. In the illustrated embodiment, a UV lamp 69 is located within the collecting pipe 68, exposing all the filtered water that passes through the collecting pipe 68 to germicidal energy. The water that passes through the collecting pipe 68 and passes by the UV lamp 69 flows to the lower tank 10 where it is stored until accessed for use via the tap 30. Because the lamp 69 is potentially subjected to direct contact with water flowing through the pipe, the lamp 69 is desirably sealed against moisture, preferably within a quartz sleeve. It will be understood, of course, that in other arrangements, multiple candle filters can be employed in conjunction with a cup in which filtered water is exposed to germicidal UV light before overflowing into the general volume of the lower tank 10. See FIGS. 2 and 5.

Figure 7:
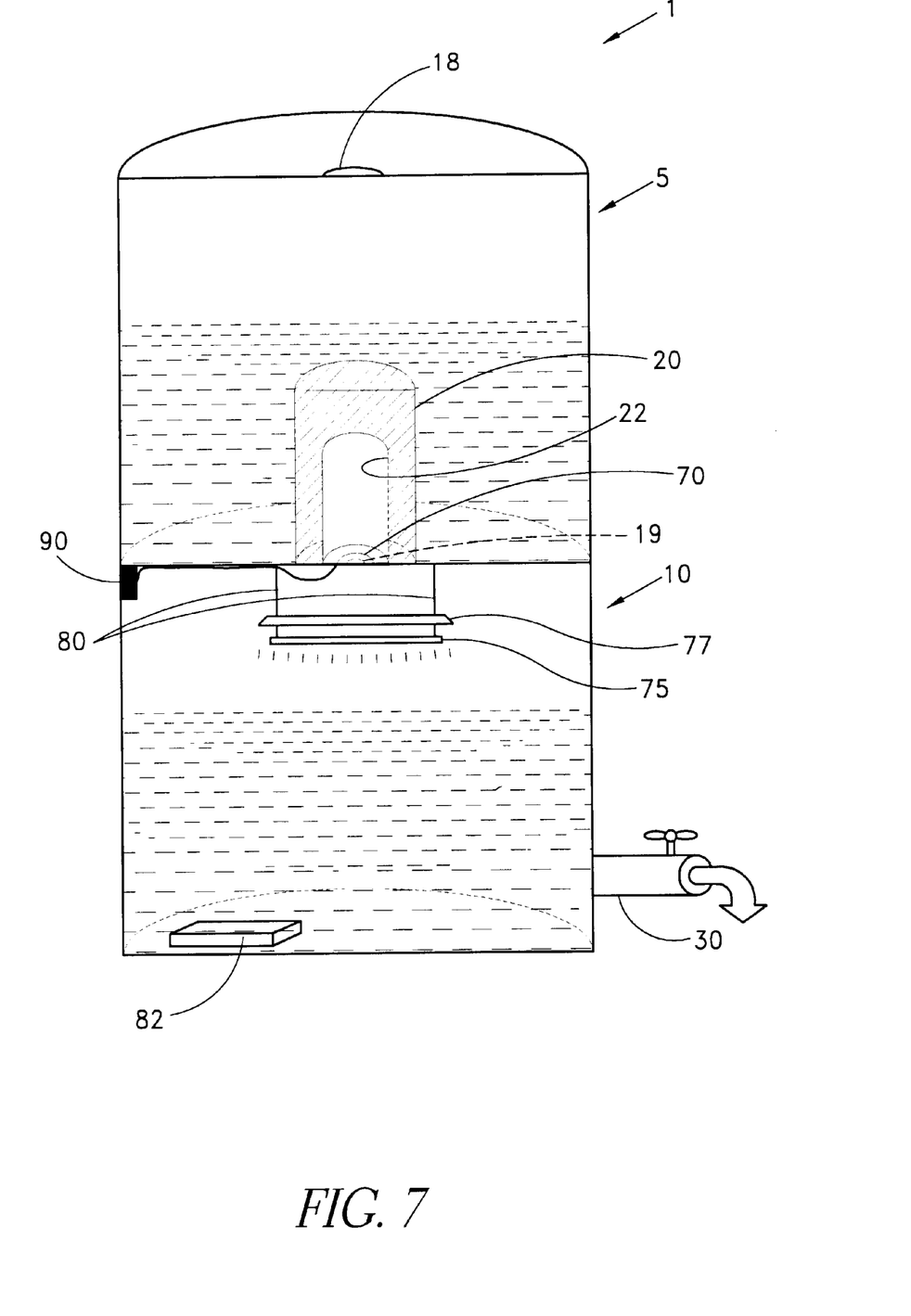
FIG. 7 is a partially cross-sectional schematic view of a water disinfector, constructed in accordance with a sixth embodiment of the present invention, having an ultraviolet lamp suspended in a lower tank.

FIG. 7 is a schematic view of a water disinfector 1 constructed in accordance with a sixth preferred embodiment, where parts similar to those of the previously described embodiments are referenced by like numbers. As with the previously described embodiments, an upper tank 5 holds a filter element over an outlet 19, and the filter preferably comprises a ceramic candle filter 20. The disinfector 1 of the sixth embodiment includes features arranged to allow batch irradiation with germicidal UV light. Due to the slow flow rate of water through the preferred ceramic filter 20 (e.g., about 1 L/hr.), it can be energy-efficient to expose filtered water to periodic doses of UV light, rather than as water flows past.

In the upper tank 5, a stopper 70 is fitted to selectively seal off the outlet 19. The stopper 17 controls the flow of filtered water from the upper tank 5 to the lower tank 10, preferably by an electronic mechanism.

In the lower tank 10 a UV light source, preferably a conventional UV lamp 75, is suspended above the water level. The water level in the lower tank 10 can be controlled to remain below the UV lamp 75, for example, by overflow outlets (not shown) in the sidewalls of the lower tank 10. Depending upon the selected depth of water to be irradiated and upon the timer mechanism for batch irradiation, as will be understood from the disclosure below, the UV lamp 75 is preferably rated for a power level between about 4 W and 60 W, more preferably between about 10 W and 40 W.

Desirably, the UV lamp 75 is shielded from dripping water by a canopy 77. The underside of the canopy 77 is preferably provided with a reflective surface to redirect upward irradiation toward the filtered water below. Each of the lamp 75 and canopy 77 are suspended within the lower tank 10, such as by cords 80 as shown. The lower tank 10 also holds a stirring mechanism 82, shown schematically only in FIG. 7. As will be appreciated by the skilled artisan, the stirring mechanism 82 can comprise a bubbler, a rotating propeller, or other device for causing the filtered water within the lower tank 10 to be mixed.

The illustrated disinfector 1 further includes a circuit board 90 in electrical communication with the stopper 70, the lamp 75 and the stirring mechanism 82. Desirably, the circuitry includes a timing mechanism and is arranged to simultaneously operate the stopper 70, lamp 75 and stirring mechanism 82 for a fixed period of time upon an initiation signal. Most preferably, the circuitry is also connected to the dispensing tap 30, such that the tap 30 is inoperable if water in the lower tank 10 has not yet been irradiated.

In operation, water is fed to the upper tank 5 through the inlet 18, and filtered through the candle filter 20. Filtered water is collected in the lower tank 10 until a disinfecting initiation signal is generated. The initiation signal can be generated by a button pushed by the user prior to dispensing water through the tap 30. Alternatively, a sensor (not shown) can determine that a suitable water level has been obtained in the lower tank 10, causing an initiation signal to be automatically generated.

In either case, initiation desirably causes the circuitry 90 to generate signals that close the stopper 70 to prevent any more water from entering the lower tank 10. The circuitry 90 also generates signals to turn on the UV lamp 75 and the stirring mechanism 82. Stirring the water reduces the UV dosage needed to safely disinfect a given volume of water by effectively reducing the depth through which the light must penetrate. The skilled artisan can readily determine, in view of the present disclosure, the appropriate length of exposure time to ensure full disinfection, given a rate of stirring, lamp power and volume of water to be disinfected. Advantageously, the turbidity of the water (and hence the coefficient of UV light absorption) can be assumed constant for the illustrated device, since the ceramic filtering assures a certain level of UV transparency in the filtered water.

After the calculated period of irradiation has passed, the circuit board 90 desirably causes the lamp 75 to shut off and allows operation of the tap 30, until such time as the stopper 70 is opened to allow more filtered (but non-irradiated) water to flow into the lower tank 10. The circuitry can be arranged to allow manual opening of the stopper 70, or to prevent the stopper 70 from opening until the level of disinfected water in the tank 10 has been reduced to a predetermined level by removal through the tap 30.

Figure 8:
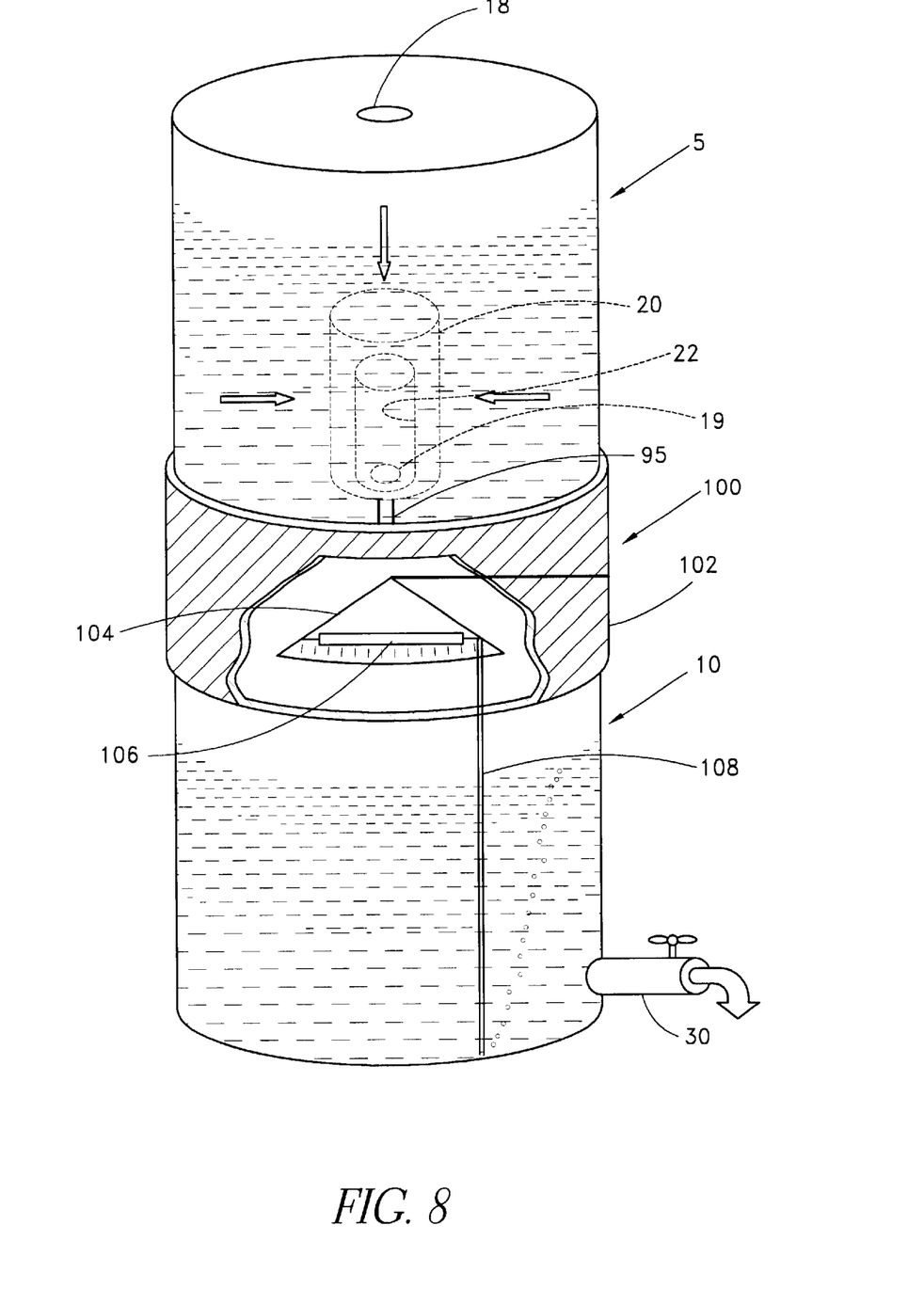
FIG. 8 is a schematic, partially cut-away view of a water disinfector constructed in accordance with a seventh embodiment of the present invention, having a support ring for a suspended ultraviolet lamp.

FIG. 8 is a schematic view of a water disinfector 1 constructed in accordance with the seventh preferred embodiment, where parts similar to those of the previously described embodiments are referenced by like numbers. As with the previously described embodiments, an upper tank 5 holds a filter element over an outlet 19, and the filter preferably comprises a ceramic candle filter 20. In the illustrated embodiment, an outlet pipe 95 leads downwardly from the outlet 19 to the lower tank 10. In place of the stopper of FIG. 7, the disinfector includes a controllable valve (not shown) within the outlet pipe 95. Like FIG. 7, the disinfector 1 of FIG. 8 is configured for batch irradiation.

An intermediate support ring 100 is placed between the upper tank 5 and the lower tank 10. The ring 100 comprises sidewalls 102 configured to mate to the bottom of the upper tank 5 and the top of the lower tank 10. A protective canopy 104, desirably having a reflective underside, is suspended from the sidewalls 102 of the ring 100. A UV light source or lamp 106 can be suspended from the canopy 104, as shown, or can be independently suspended from the sidewalls 102. As in the embodiment of FIG. 7, the canopy 104 serves to protect the lamp 106 from water filtered through the candle filter 20.

The illustrated disinfector also includes a stirring mechanism, illustrated as a bubbler 108 having a pipe for forcing air out into the water. The bubbler 108 can have a conventional construction, such as commonly available for use in aquariums. Though shown suspended from the canopy 104, the bubbler 108 can also be directly mounted upon the sidewall 102 of the intermediate ring 100.

The embodiment of FIG. 8 can operate in the same manner as described above with respect to the batch device of FIG. 7. Advantageously, the embodiment of FIG. 8 can be readily assembled by provision of the intermediate ring 100. Since the tanks 5, 10 and the candle filter 20 are readily available in many areas of intended use, only the components attached to the ring need to be provided independently. Accordingly, transportation costs can be minimized.

Figure 9:
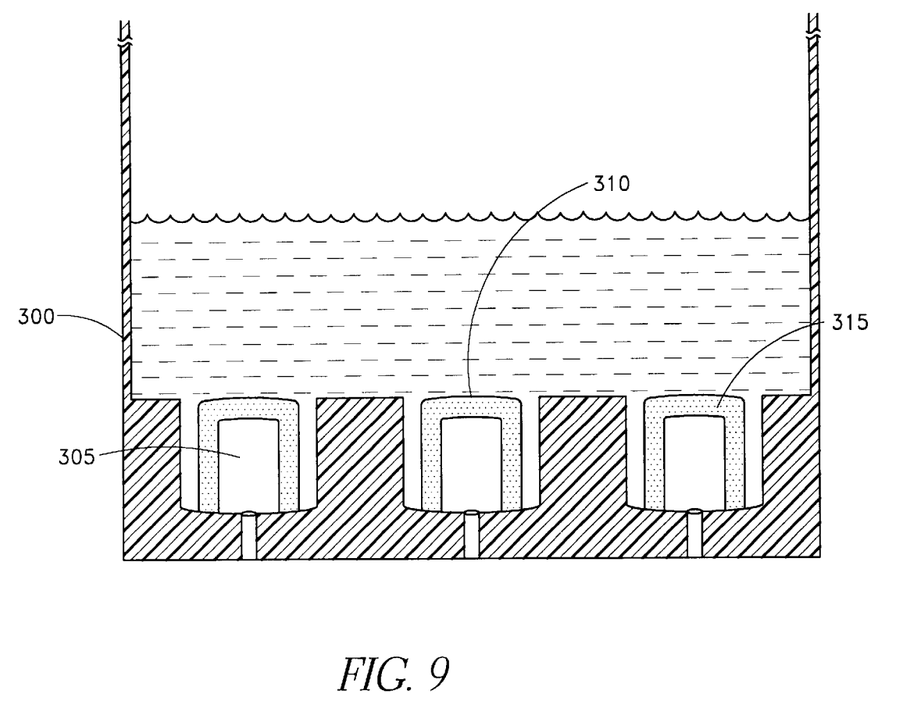
FIG. 9 is a schematic cross-section of a water disinfector constructed in accordance with a eighth embodiment of the present invention, having countersunk ceramic candles.

The embodiment of FIG. 9, like that of FIG. 6, includes multiple ceramic candle filters 305, 310, 315. The filters are countersunk into the upper tank 300 to increase the flow rate of water through the upper tank 300. Any number of ceramic candle filters can be used. Each of the ceramic filters 305, 310, 315 can be sealed as described above. With the use of multiple countersunk ceramic filters, the water pressure all around the ceramic filters 305, 310, 315 is substantially uniform and high, until the water in the upper tank 300 is almost exhausted. Water flow is thus increased throughout the filtration process.

Figure 10:
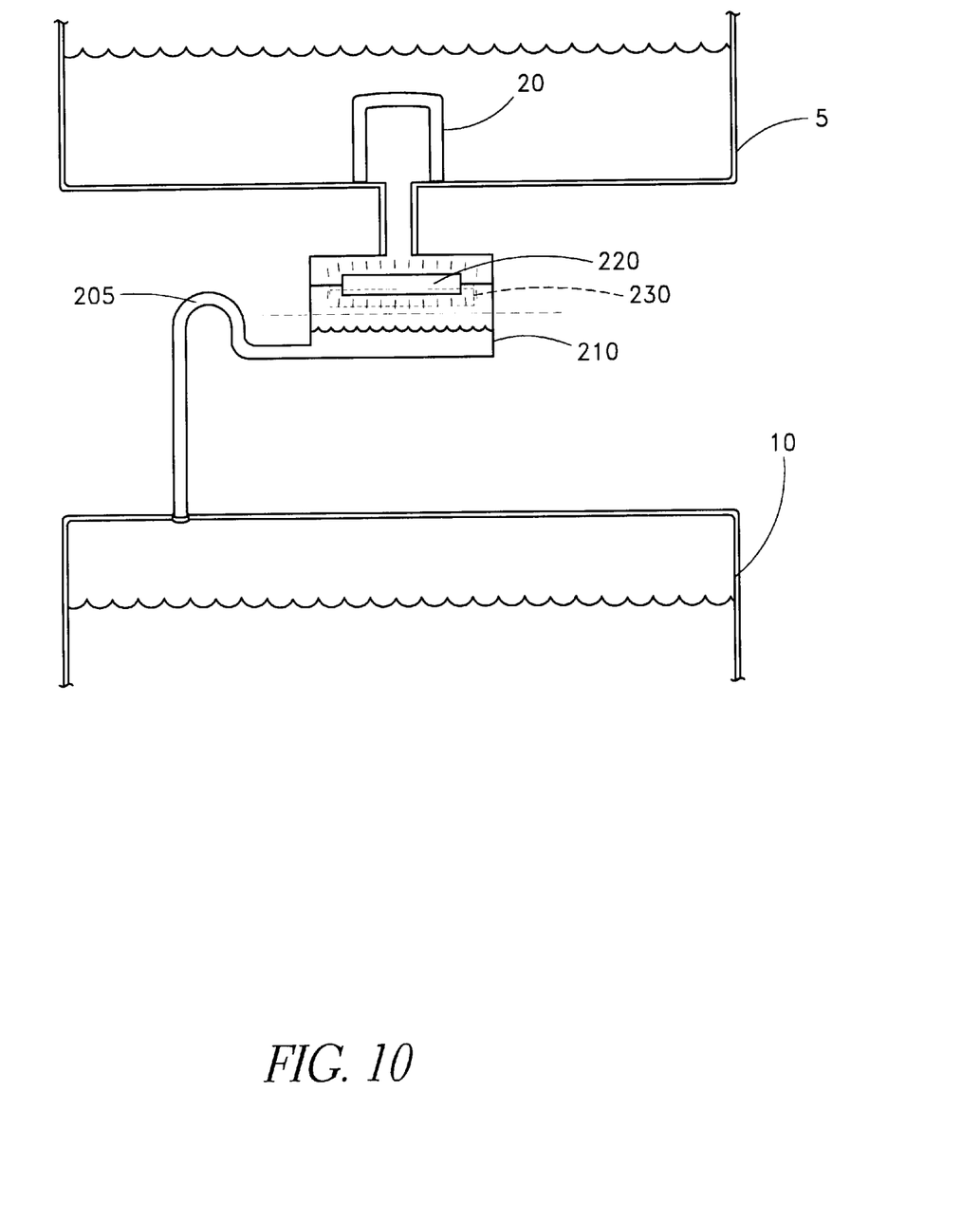
FIG. 10 is a schematic view of a water disinfector constructed in accordance with a ninth embodiment of the present invention, having an intermediate holding tank with an automatic valve arrangement.

With reference to FIG. 10, a water disinfector 1 is shown constructed in accordance with the ninth preferred embodiment, where parts similar to those of the previously described embodiments are referenced by like numbers. As with the previously described embodiments, an upper tank 5 holds a filter element over an outlet 19, and the filter preferably comprises a ceramic candle filter 20. In addition, an intermediate holding tank 210 is positioned in the flow path between the upper tank and the lower tank 10. While schematically shown between the two tanks, the intermediate holding tank can be suspended in the upper portion of the lower tank 10. A siphon 205 connects the storage portion of the lower tank 10 to the intermediate holding tank 210.

In operation, the siphon 205 serves as an inexpensive, mechanical, automatic valve. The intermediate holding tank 210 is periodically emptied through the siphon 205 into the lower tank 10. Water fills up the intermediate holding tank 210 from the upper tank 5 after the water has passed through the ceramic filter 20. The siphon 205 prevents the water from flowing into the lower tank 10 until a predetermined water level is reached. As the water fills the intermediate holding tank 210, a UV lamp 220 irradiates the water. When the predetermined water level is reached, the siphon 205 allows for siphoning action to occur thus allowing substantially all the disinfected water to flow from the holding tank 210 into the lower tank 10. Once substantially all the water has flowed into the lower tank 10, the siphoning action of the siphon 205 ends and the intermediate water tank begins filling up with water once again.

In the embodiment of FIG. 10, all the water in the lower tank 10 is always disinfected and ready for use. Accordingly, unlike the batch system of FIG. 7, for example, no safety mechanism is needed to prevent use of filtered but undisinfected water.

In the arrangement described above, the filtered water is collected in a constantly irradiated in the intermediate holding tank 210. This irradiated (disinfected) water is periodically drained to the lower tank 10.

In another arrangement, the UV exposure can be started when the water level in the intermediate holding tank 210 reaches a desired height below the siphoning level. It stops when the siphoning starts or after a predetermined duration, whichever comes first. As an example, the top of the inverted U of the siphon is positioned below the lamp 220 in the intermediate holding chamber 210, such as at a point half way up the height of the chamber 210. When the filtered water in the holding chamber 210 reaches four fifths (80%) of the siphoning height, a sensor can trigger a switch to turn the lamp 220 on. The lamp 220 remains on while more water slowly continues to filter through the candle filter 20. A stirring mechanism (not shown) in the intermediate holding chamber 210 can also be turned on while the lamp is turned on. When the water level in the intermediate holding tank reaches the halfway point, or the level of the top of the siphon 205, substantially all of the water empties from the intermediate holding chamber 210 to the lower tank 10. At the same time, the sensor can trigger the switch and turn off the lamp 220 until filtered water again rises to the level that triggers the lamp 220. It also starts and runs for a full predetermined duration whenever the lid of the upper tank 5 is opened and closed. These latter operations address cases when the upper tank 5 runs empty and there is water in the intermediate holding tank 210.

In still another arrangement, the activation of the siphon 205 can trigger a mechanical switch (e.g., within the siphon 205) that turns on a UV lamp in the lower tank 10, along with a stirring mechanism for a fixed period of time. Water is unavailable for short periods while irradiation is going on, but available during the long periods in between irradiation doses.

The volume of the intermediate holding tank 210 is preferably between about 0.25 gallons and 2 gallons, more preferably between about 0.25 gallons and 0.5 gallons. The preferred siphoning level is at about half of the tank 210 height, while the trigger height is slightly below this level (e.g., at 45% of the tank 210 height). The preferred predetermined duration of UV irradiation when the lid is opened is between about 60 seconds and 120 seconds.

In the illustrated arrangement, water from the candle 20 first drips into one end of a small tray 230, and then overflows into the holding tank 210. Both the small tray 230 and holding tank 210 are simultaneously exposed to UV when the lamp 220 is on. The tray 230 is designed such that the residence time of freshly dripping water into the tray 230 is much longer than the time needed to empty the holding tank 210 via the siphon 207. This ensures that, even during the siphoning, only fully irradiated water flows into the lower tank 10. Any water leaving the filter 20 during siphoning stays in the tray 230 until the siphon action stops.

Advantageously, the embodiments described hereinabove provide inexpensive yet effective disinfection of water to potable levels of purity. While the slow rate of gravity-fed filtration might be viewed as a hindrance to water disinfection, when the UV lamp is operated as filtered water flows past, the slow rate of ceramic filtration advantageously ensures complete exposure of the filtered water. Safe UV disinfection can thus be achieved with lower power. At the same time, feed water will generally be filtered sufficiently through the ceramic filter 20 to provide clear water with a consistently high UV extinction coefficient. Turbidity can thus be reduced such that power can be set to minimal levels for ensuring safe UV disinfection, whether performing the disinfection in batches or as filtered water flows past the light source. Additionally, for embodiments in which the UV light source is exposed to the water, pre-filtering reduces fouling of the lamp or the quartz sleeve surrounding the lamp due to exposure to cleaner water. Reduced fouling, in turn, extends the sleeve lifespan and reduces the need for period cleaning.

Although the foregoing invention has been described in terms of certain preferred embodiments, other embodiments will become apparent to those of ordinary skill in the art, in view of the disclosure herein. Accordingly, the present invention is not to be limited by the description of preferred embodiments, but is instead to be defined solely by reference to the appended claims.

We claim:

1. A method for disinfecting water, comprising:

feeding water into a water delivery system;

driving the water at a flow rate of less than about 4 L/hr through a ceramic filter within the water delivery system by gravity to produce filtered water, the ceramic filter having a pore size with a nominal rating between about 0.5 $\mu$m and 10 $\mu$m; and exposing the filtered water to ultraviolet light within the water delivery system downstream of the ceramic filter.

2. The method of claim 1, wherein exposing comprises conducting a timed irradiation of the filtered water while it is stored downstream of the ceramic filter.

3. The method of claim 2, wherein exposing further comprises stopping the flow of the water through the ceramic filter during the timed irradiation.

4. The method of claim 1, further comprising temporarily storing the filtered water in a holding tank and automatically releasing the filtered water when it reaches a predetermined level in the holding tank.

5. The method of claim 4, wherein exposing is conducted within the holding tank.

6. The method of claim 4, wherein exposing is conducted in a lower tank downstream of the holding tank.

7. The method of claim 1, wherein exposing comprises flowing the filtered water past a source of ultraviolet light within the water delivery system at a rate of less than about 4 L/hour.

8. The method of claim 1, wherein exposing comprises flowing the filtered water within a distance of less than about 4 inches from a source of ultraviolet light within the water delivery system.

9. A method for disinfecting water, comprising:

feeding water into a first container;

driving the water by gravity alone at a flow rate of less than about 4 L/hr through a ceramic filter within the first container to produce filtered water, the ceramic filter having a pore size with a nominal rating between about 0.5 $\mu$m and 10 $\mu$m;

driving the filtered water by gravity alone past an ultraviolet light source in an intermediate container to produce disinfected water;

holding the disinfected water in the intermediate container by use of a valve; and opening the valve in the intermediate container, allowing the disinfected water to flow to a second container by operation of gravity.

10. The method of claim 9, wherein the valve is a siphon.

11. The method of claim 9, further comprising switching the ultraviolet light automatically according to water level in the intermediate container.

12. The method of claim 9, wherein the ultraviolet light is switched on and off as the valve is closed and opened, respectively.

* * * * *